L. PITMAN.
Surveying Instrument.
No. 9,888.  Patented July 26, 1853.
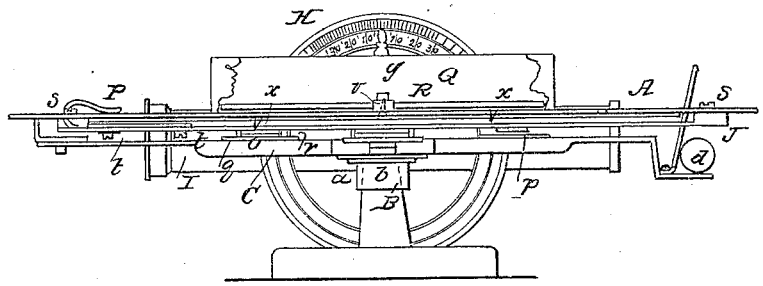
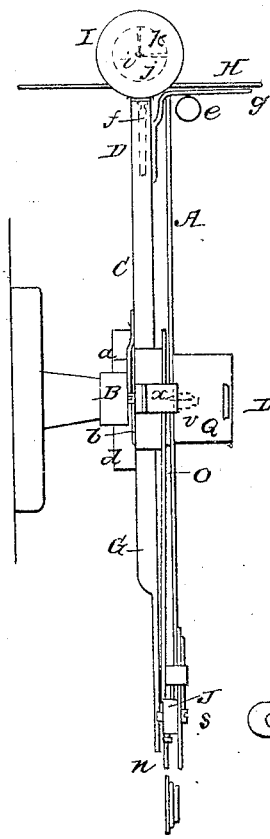
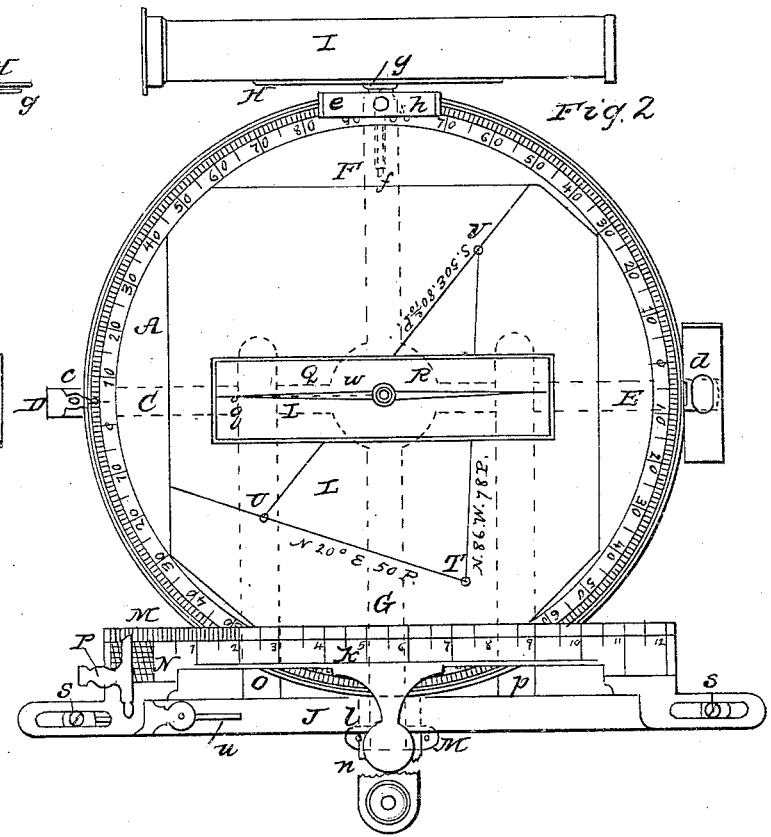

UNITED STATES PATENT OFFICE.

LEVI PITMAN, OF TOMS BROOK, VIRGINIA.

PLOTTING-THEODOLITE.

Specification of Letters Patent No. 9,888, dated July 26, 1853.

*To all whom it may concern:*

Be it known that I, LEVI PITMAN, of Toms Brook, in the county of Shenandoah and State of Virginia, have invented a new, useful, and Improved Plotting-Theodolite; and I do hereby declare that the same is described and represented in the following specification and accompanying drawings.

The practice generally pursued by surveyors has been to take the courses with a compass, and the distances with a chain and note both in a field book, and then to plot the survey with a scale, protractor and dividers, consuming much time and it is frequently difficult to draw the plot from the field notes, so as to correspond in all its parts with the angles and distances noted, so that the plotter is compelled to make a forced connection at some one or more points or angles, in order to complete his figure. With the aid of my improved plotting theodolite the surveyor is enabled to draw each line of the diagram, and note the course immediately after he sights it, in about the same time it would take him to enter it in the field book; and as soon as the distance is ascertained he can note it on the line drawn and measure it upon the plot fixing or marking a point from which to draw his next line as soon as it is sighted, in this way he is enabled to take his courses and distances and make his plot or diagram in about the same time it would take him to take his courses and distances and make the notes in his field book.

My improvements consist in arranging a traversing scale over the dial, adjusted and connected to a sliding frame under the dial upon which a piece of paper is fastened to mark the plot upon and rule a line by the traversing scale and note the course, so that when the instrument is taken to the position sighted to and the distance measured it can be marked upon the line, and the point measured to, can be measured upon the paper by the traversing scale, which is then moved back and the needle box replaced, and the next point sighted to and the needle box removed, and the line and course marked. Also in applying an adjustable index to the traversing scale so as to measure minute divisions accurately.

To enable others skilled in the art to make and use my invention I will proceed to describe its construction and the mode of using it, referring to the drawings above-mentioned in which the same letters indicate like parts in each of the figures.

Figure 1, is an elevation of the instrument as seen when looking toward the face of the vertical dial. Fig. 2 is a plan or top view. Fig. 3 is an elevation as it is seen looking toward the edge of the vertical dial.

A is a horizontal dial with the degrees and parts of degrees marked upon it with the socket B fastened to the underside for the end of the staff or pivot of the tripod. The frame C (represented by dotted lines in Fig. 2) is fitted to turn on the socket B, and is held upon the socket by the forked slide $a$ fastened to the frame and fitted to the groove $b$ in the socket. The frame C has four arms D, E, F and G.

The index $c$ to the dial A is fastened to the arm D, and a spirit level $d$ to the arm E; also another spirit level $e$ to the arm F the end of which arm is perforated for the spindle $f$ which is fitted to turn freely in it and has a score in it for the end of the screw $h$, which holds it in its place and allows it to turn. The vertical dial H and sighting tube I are fastened to the spindle $f$ which dial H is marked with degrees so that the index $g$ fastened to the arm F will indicate the position and angle of the sighting tube I which tube is covered at one end except the sighting hole $i$; and at the opposite end is furnished with a perpendicular point $j$ and horizontal point $k$ represented by dotted lines, the sighting points $k$ and $j$ enable the surveyor to take the course and angle of elevation at the same time and as the tube and spindle may be rotated so as to sight in each direction from the same position.

The arm G is provided with a cross at the end furnished with two pins $l$ and $m$ which hold the slide $n$ of sliding frame J to which frame the slides $o$ and $p$ are fastened. The slide $o$ traverses on the arm D between the pins $q$ and $r$ (as represented by dotted lines in Fig. 2) the slide $p$ traverses upon the arm E. The slide $n$ is represented with a piece broken out but it should be made as long as the slide $o$. The sliding frame J has a projection at each end a little higher than the top of the dial A, upon which the traversing ruler K rests and slides being made with a slot in each end for the screws $s$, $s$; which hold it in its place and allow it to traverse endwise, so as to measure distances upon the plotting paper L fastened to the dial A, by the scale M marked upon the ruler K. There is a diagonal scale N at the end of the scale M upon the ruler K; which diagonal scale N is provided with an adjusting index P so as to enable the surveyor to measure tenths of the divisions on the scale M; this adjusting index N is bent around under the ruler and traverses on the frame J being furnished with the screw t t which slide in the slots u, u in the frame J as represented in the drawing. The needle box Q is constructed in the form represented and one side is broken away in Fig. 1, to show an elevation of the needle R fitted to vibrate on the pivot v (represented in dotted lines). There is a line w in the bottom of the needle box so as to adjust the dial a to the true position before sighting which line w is also represented by a dotted line in Fig. 2. There are two holes in the dial A and plotting paper L, to which holes the pivots x x fastened to the bottom of the needle box Q are fitted so as to insure the needle box to be placed in its true position upon the dial which pivots are represented in dotted lines in Fig. 1.

The instrument having been constructed and completed as above described and placed upon a tripod with a piece of paper L fastened to the dial A to mark the plot upon and perforated to correspond with the holes in the dial A for the pivots of the needle box which is placed upon it; and the dial is turned so that the needle settles north and south, and the object sighted is found to stand north 20° east; I make a mark T for a starting point on the plotting paper and draw a line from it by the traversing ruler or scale; I then measure the distance to the object and find it 50 poles and measure and mark it on the line from T by the traversing scale making the point U; I then sight from that position and find the next point is south 50° east and rule a line from V, and measure the distance and find it $80\frac{2}{10}$ poles and mark it on the line ruled; and then sight to the first position taken and find it is N. 86 west and rule a line from V to T and measure the distance and find it to be 78 poles and apply the traversing scale to measure the distance from V to T on the plot and it corresponds with the distance measured.

To take elevations the frame of the instrument is set level by the levels c and d and the object sighted and the index g denotes the degrees of elevation on the vertical dial H which may be noted on the plot or elsewhere.

I contemplate my invention and improvements may be modified in various ways without departing from the principles of my invention. I contemplate graduating the traversing ruler upon both sides so that it may be used either side up and making the spaces in the scale shorter upon one side than the other.

It will be apparent from the foregoing description that with my improved instrument elevations and courses can be taken in either direction and a plat accurately drawn with the greatest expedition and accurateness without any mistake and save much of the time and labor of the old plan of surveying and plotting.

What I claim as my invention and desire to secure by Letters Patent is—

1. The adjusting index or its equivalent in combination with the graduated scale upon the traversing ruler and the horizontal dial substantially as described.

2. I do not claim a rotating drafting board turning upon a fixed center pin in a protracting arch, with a traversing ruler working upon two graduated parallel guide strips, such as have been used heretofore; but what I do claim is a dial such as is herein described, fixed upon a staff or socket B in combination with the revolving frame c (turning under said dial on the socket B), and carrying the traversing ruler K and a suitable sight vane constructed and operating as described.

In testimony whereof, I have hereunto signed my name before two subscribing witnesses.

LEVI PITMAN.

Witnesses:
S. C. DONN,
W. W. TUCKER.